United States Patent [19]

Koseki et al.

[11] Patent Number: 5,043,405
[45] Date of Patent: Aug. 27, 1991

[54] METHACRYLIC COPOLYMER HAVING LOW MOISTURE ABSORPTION PROPERTIES

[75] Inventors: Toshinori Koseki, Kamakura; Kimio Imaizumi, Kawasaki, both of Japan

[73] Assignee: Asahi Kasei Kogyo Kabushiki Kaisha, Osaka, Japan

[21] Appl. No.: 545,665

[22] Filed: Jul. 2, 1990

Related U.S. Application Data

[63] Continuation of Ser. No. 246,823, filed as PCT JP88/00099 on Jan. 7, 1988, abandoned.

[51] Int. Cl.⁵ .............................................. C08F 18/20
[52] U.S. Cl. ..................................... 526/245; 526/309
[58] Field of Search ................................ 526/245, 309

[56] References Cited

U.S. PATENT DOCUMENTS

| 4,405,671 | 9/1983 | Ozawa et al. | 428/522 |
| 4,509,163 | 4/1985 | Kamada et al. | 526/309 |
| 4,680,359 | 7/1987 | Liebler et al. | 526/309 |

FOREIGN PATENT DOCUMENTS

| 57-33446 | 2/1982 | Japan . |
| 57-108012 | 7/1982 | Japan . |
| 57-162135 | 10/1982 | Japan . |
| 57-186241 | 11/1982 | Japan . |
| 58-127754 | 7/1983 | Japan . |
| 58-154751 | 9/1983 | Japan . |
| 59-1518 | 1/1984 | Japan . |
| 59-227909 | 12/1984 | Japan . |
| 60-104110 | 6/1985 | Japan . |
| 60-115605 | 6/1985 | Japan . |

OTHER PUBLICATIONS

J58127754, Asahi Chemical Ind. KK, 7/29/83.

Primary Examiner—Joseph L. Schofer
Assistant Examiner—N. Sarofim
Attorney, Agent, or Firm—Armstrong, Nikaido, Marmelstein, Kubovcik & Murray

[57] ABSTRACT

The methacrylic copolymer of the present invention is a novel copolymer having low moisture absorption properties which comprises specific proportions of methyl methacrylate units and tert-butylcyclohexyl methacrylate units, optionally with specific ethylenically unsaturated compound units copolymerizable with the above-mentioned monomer units. The copolymer of the present invention is excellent not only in colorlessness, transparency, moldability, low double refraction and heat stability but also in low moisture absorption properties and heat resistance and, therefore, is suitable for use as a material for shaped articles, such as an optical element substrate and a light transmissible extruded plate, and can particularly advantageously be used for applications, such as an optical disc substrate.

17 Claims, 1 Drawing Sheet

METHACRYLIC COPOLYMER HAVING LOW MOISTURE ABSORPTION PROPERTIES

This application is a continuation of application Ser. No. 246,823, filed PCT JP88/00099 on Jan. 7, 1988, now abandoned.

DESCRIPTION

1. Technical Field

The present invention relates to a novel methacrylic copolymer having low moisture absorption properties. More particularly the present invention is concerned with a methacrylic copolymer having low moisture absorption properties comprising specific proportions of tert-butylcyclohexyl methacrylate units and methyl methacrylate units, optionally with specific ethylenically unsaturated compound units copolymerizable with the above-mentioned monomer units, which is excellent not only in colourlessness, transparency, moldability, low double refraction properties and heat stability, but also in low moisture absorption properties and heat resistance and, therefore, is useful as a raw material for shaped articles such as an optical element substrate and a light transmissible extruded plate. The present invention is also concerned with a shaped article produced from this methacrylic copolymer having low moisture absorption properties.

The term "optical element substrate" as used herein is intended to mean a substrate body for an optical element. The term "optical element" as used herein is intended to mean all types of elements which utilize optical characteristics such as light transmission, refraction, reflection and the like. Representative examples of optical elements include an optical disc for information recording (hereinafter referred to as "optical disc"), an optical card for information recording, an optical sheet for information recording, an optical film for information recording, a lens, a mirror and a prism. Representative examples of light transmissible extruded plates include a signboard, a display, a partition, a window for lighting, a front plate for a television and a front plate for a liquid crystal display.

2. Background Art

Heretofore, methyl methacrylate resins have widely been used as a material for articles, which are capable of exhibiting their functions by light transmission, for example, an optical element substrate such as an optical disc substrate, and a light transmission plate, because methyl methacrylate resins have excellent optical characteristics, such as excellent transparency and low double refraction properties.

However, methyl methacrylate resins exhibit high moisture absorption properties, and, therefore, they easily undergo dimensional change, warpage, deformation and the like by the absorption of moisture. Further, methyl methacrylate reins are poor in heat resistance. Accordingly, they have drawbacks in that they are susceptible to deterioration in mechanical properties, warpage and deformation in high temperature environments. Therefore, the use of methyl methacrylate resins is limited.

At present, various types of discs, such as a read-only disc, a direct read after write disc and an erasable direct read after write disc are practically used as optical discs. A material for substrates of such discs is required to be satisfactory in various properties, such as transparency, moldability, low double refraction, heat stability, low moisture absorption and heat resistance. However, a resin satisfying all of these requirements has not been available. Accordingly, optical discs made using conventional resins as a material for the substrates of the discs really suffer from various restrictions. For example, in a video disc, which is one of the read-only discs, a methyl methacrylate resin has been used as a material for the substrate of the disc. However, since a methyl methacrylate resin is highly absorptive for moisture, a video disc comprising a substrate made of a methyl methacrylate resin, a metallic layer formed on one surface of the substrate by vapor deposition and a protective layer formed on the metallic layer is susceptible to warpage and deformation by the absorption of moisture. Accordingly, for practical use, two substrates are laminated in order to prevent warpage and deformation.

In a compact disc (a digital audio disc), which is another type of read-only disc, a polycarbonate resin has been used as a material for a compact disc substrate. In such a compact disc, a laminate of two substrates cannot be used. Therefore, a methyl methacrylate resin which is susceptible to warpage and deformation by the absorption of moisture and which is also likely to undergo deformation in high temperature environments, e.g., inside an automobile in summer because of its poor heat resistance, cannot be used as a material for a compact disc substrate. With respect to a polycarbonate resin, although it is inferior in moldability and also disadvantageously exhibits high double refraction, it is used in practice as a compact disc substrate because, among optical discs, a compact disc is relatively small in size and is not required to have high accuracy.

Therefore, if a resin which not only has excellent properties inherent in a methyl methacrylate resin, such as excellent transparency, excellent moldability, low double refraction and high heat stability but also exhibits low moisture absorption and excellent heat resistance, is utilized as a material for optical disc substrates, optical discs made from such a resin as a substrate material would advantageously be able to be used as any type of optical discs, such as a read-only disc, a direct read after write disc and an erasable direct read after write disc.

In order to improve the undesirable moisture absorption properties of a methyl methacrylate resin, there were proposed techniques in which methyl methacrylate is copolymerized with styrene (see Japanese Patent Application Laid-Open Specification Nos. 57-33446, 57-162135 and 57-108012). However, by the copolymerization of methyl methacrylate with styrene, the moisture absorption properties of the resultant copolymer is not very effectively lowered. Further, when the styrene unit content of the copolymer is increased in order to increase lowering of the moisture absorption properties of the copolymer, the double refraction of the copolymer is increased and thus the excellent properties inherent in a methyl methacrylate resin are lost, so that the copolymer cannot be used for an optical element substrate (e.g. an optical disc substrate). Further, copolymerization of methyl methacrylate with styrene does not improve the heat resistance of the resultant copolymer and therefore the copolymer cannot be used in the fields where a heat resistance higher than that of a methyl methacrylate resin is required.

On the other hand, there were also proposed techniques in which methyl methacrylate is copolymerized with cyclohexyl methacrylate in order to lower the moisture absorption properties of a methyl methacrylate resin without so greatly increasing its double refraction (see Japanese Patent Application Laid-Open Specification Nos. 57-186241, 58-127754 and 58-154751, 59-1518 and 60-104110). However, by the copolymerization of methyl methacrylate with cyclohexyl methacrylate, the moisture absorption properties of the resultant copolymer is not very effectively lowered. Further, when the content of the cyclohexyl methacrylate units in the copolymer is increased so as to more effectively lower the moisture absorption properties of the copolymer, the heat resistance of the copolymer is considerably lowered and the copolymer becomes extremely brittle. Therefore, an optical disc made of such a copolymer is susceptible to warpage and deformation by the heat generated, for example, during handling. This causes difficulty in recording or reading of information with high accuracy, or breakage of an optical disc during handling, thereby causing a problem that the use of the optical disc is extremely restricted.

Further, in order to lower the moisture absorption properties of a methyl methacrylate resin without increasing its double refraction, there were proposed a method in which methyl methacrylate is copolymerized not only with cyclohexyl methacrylate but also with 4-isopropylcyclohexyl acrylate and dicyclohexyl fumarate (see Japanese Patent Application Laid-open Specification No. 57-186241), and a method in which methyl methacrylate is copolymerized with 3,3,5-trimethylcyclohexyl methacrylate and isobornyl methacrylate (see Japanese Patent application Laid-open Specification No. 60-104110). In these methods, however, although the moisture absorption properties of methyl methacrylate resins are lowered, the resins obtained are caused to become inferior with respect to heat distortion resistance, mechanical strength and heat stability.

Moreover, in order to both lower moisture absorption and improve heat resistance of a methyl methacrylate resin, there are proposed techniques in which methyl methacrylate is copolymerized with isobornyl methacrylate (see Japanese Patent Application Laid-Open Specification Nos. 59-227909 and 60-115605). However, by the copolymerization of methyl methacrylate with isobornyl methacrylate, the moisture absorption properties of the resultant copolymer are not very much lowered. Further, when the content of the isobornyl methacrylate units in the copolymer is increased in order to lower the moisture absorption properties of the copolymer, the copolymer becomes markedly brittle so that breakage of an optical disc made from the copolymer is likely to occur during handling, thereby causing a problem that the use of the optical disc made from such a copolymer is restricted. When methyl methacrylate is copolymerized with isobornyl methacrylate under customarily employed radical polymerization conditions as described in the above-mentioned patents, a considerable quantity of the monomer remains unreacted and it is very difficult to remove the unreacted monomer from the resultant resin. The presence of the unreacted monomer in the resin not only markedly lowers the heat resistance, but the heat stability of the resin is also markedly lowered. Therefore, if it is attempted to prepare a shaped article from the resin containing a large quantity of the unreacted monomers, disadvantageous foaming and discoloration occur during molding of the resin so that the molding cannot be performed. Further the shaped article is likely to be discolored, and the heat resistance of the obtained article is often not improved as much as expected. Thus, the use of the shaped article is necessarily limited. Furthermore, a resin as obtained by the copolymerization using isobornyl methacrylate is inherently low in heat stability. Therefore, even if the content of the remaining monomers has been decreased by purification, for example, by reprecipitation of the resin from a solvent, when the resin is subjected to melt molding at high temperatures, e.g., a temperature as high as 280° C., such high temperatures being employed for attaining high reproducibility of pits in the injection molding for forming an optical disc substrate, marked discoloration and decomposition-forming simultaneously occur, leading to a difficulty in obtaining a good shaped article.

Also, there was a proposal to copolymerize methyl methacrylate with bornyl methacrylate, 3,5-dimethyladamantyl methacrylate, and fenchyl methacrylate for simultaneously lowering the moisture absorption properties and improving the heat resistance of a methyl methacrylate resin (see Japanese Patent Application Laid-Open Specification No. 59-227909). However, in this proposal, the moisture absorption properties are lowered, but the resin obtained has a disadvantage in that it is not only low in mechanical strength but also poor in heat stability so that it suffers from discoloration and decomposition-foaming when subjected to melt molding at a temperature as high as 280° C.

DISCLOSURE OF THE INVENTION

It is an object of the present invention to provide a methacrylic copolymer having low moisture absorption properties which is not only excellent in colourlessness, transparency, moldability, heat stability and heat resistance, but also exhibits low moisture absorption properties while maintaining a sufficient mechanical strength, and therefore, is useful as a material for a shaped article, such as an optical element substrate and a light transmissible extruded plate.

The present inventors have made extensive and intensive studies for attaining the above object. As a result, they have unexpectedly found that a resin prepared by copolymerizing methyl methacrylate with at least tert-butylcyclohexyl methacrylate has a water absorption (equilibrium water absorption) reduced to about 1% which is very low as compared to 2% in the case of a methyl methacrylate resin, while maintaining excellent properties inherent in a methyl methacrylate resin, such as excellent transparency, excellent moldability, low double refraction and excellent mechanical strength. In the development of a material for optical disc substrates, it is important to restrict water absorption-warpage of a material to a low level. However, reduction of water absorption-warpage can be realized only at the sacrifice of moldability, low double refraction and mechanical strength, thereby providing a technical dilemma. According to the present invention, not only can such a technical dilemma be solved, but the water absorption can be reduced to a level smaller by about 50% than that of a methyl methacrylate resin, which is an epoch-making achievement. The copolymer of the present invention has a good prospect as a material not only for substrates of optical elements such as an optical disc, but also for other various products, such as a light transmissible extruded plate with which warpage has been a serious problem. The present invention has been completed based on these findings.

According to the present invention, there is provided a methacrylic copolymer having low moisture absorption properties, comprising (A) 2 to 30% by mole of tert-butylcyclohexyl methacrylate units, (B) 60 to 98% by mole of methyl methacrylate units and (C) 0 to 30% by mole of ethylenically unsaturated compound units represented by the formula (1):

wherein $R_1$ is a hydrogen atom or a methyl group and $R_2$ is a phenyl group, a methyl-substituted phenyl group or wherein Z is an alkyl group having 1 to 8 carbon atoms, which is unsubstituted or substituted with a fluorine atom, the total of components (A), (B) and (C) being 100% by mole, and the copolymer having a weight average molecular weight in the range of from $10^4$ to $10^7$.

In the methacrylic copolymer of the present invention, the content of tert-butylcyclohexyl methacrylate units (A) is 2 to 30% by mole based on the total molar amount of components (A), (B) and (C). If the content of tert-butylcyclohexyl methacrylate is less than the above-mentioned range, low moisture absorption properties and high heat resistance, which are features of the present invention, are not sufficient. On the other hand, if the content exceeds the above-mentioned range, although the moisture absorption is lowered and heat resistance is improved, mechanical strength is undesirably lowered. The preferable range of the content of tert-butylcyclohexyl methacrylate units is 5 to 20% by mole.

Tert-butylcyclohexyl methacrylate has isomers of ortho-, meta- and para-, and each of the isomers has cis form and trans form. In the present invention, any type of isomers can be used alone or in combination in any proportions. The contents of the isomers in the copolymer of the present invention can be determined by gas chromatography analysis.

The content of methyl methacrylate (B) is 60 to 98% by mole based on the total molar amount of components (A), (B) and (C). If the content is less than the range, excellent transparency, excellent moldability and low double refraction properties which are inherent in methyl methacrylate, are lowered. On the other hand, if the content exceeds the range, low moisture absorption and heat resistant properties, which the present invention intends to attain, are insufficient. The preferable content of component (B) is 70 to 94% by mole.

In the copolymer of the present invention, there may optionally be contained, as component (C), ethylenically unsaturated compound units which are copolymerizable with component (A) and component (B). Such an ethylenically unsaturated compound is such as represented by the formula (1):

wherein $R_1$ is a hydrogen atom or a methyl group and $R_2$ is a phenyl group, a methyl-substituted phenyl group or wherein Z is an alkyl group having 1 to 8 carbon atoms, which is unsubstituted or substituted with a fluorine atom.

Examples of such monomer compounds include alkyl esters of acrylic acid, such as methyl acrylate, ethyl acrylate, butyl acrylate, isobutyl acrylate and 2-ethylhexyl acrylate; fluoroalkyl esters of acrylic acid, such as trifluoromethyl acrylate and 1,1,1-trifluoroethyl acrylate; and aromatic vinyl compounds, such as styrene, α-methylstyrene and p-methylstyrene. By incorporation of ethylenically unsaturated compound units (C), heat stability and flowability at the time of molding can be improved and moisture absorption can be lowered, but the use in excess leads to a lowering in heat resistance of the polymer. The content of component (C) is 0 to 30% by mole, preferably 2 to 20% by mole, based on the total molar amount of (A), (B) and (C).

Figure 1:
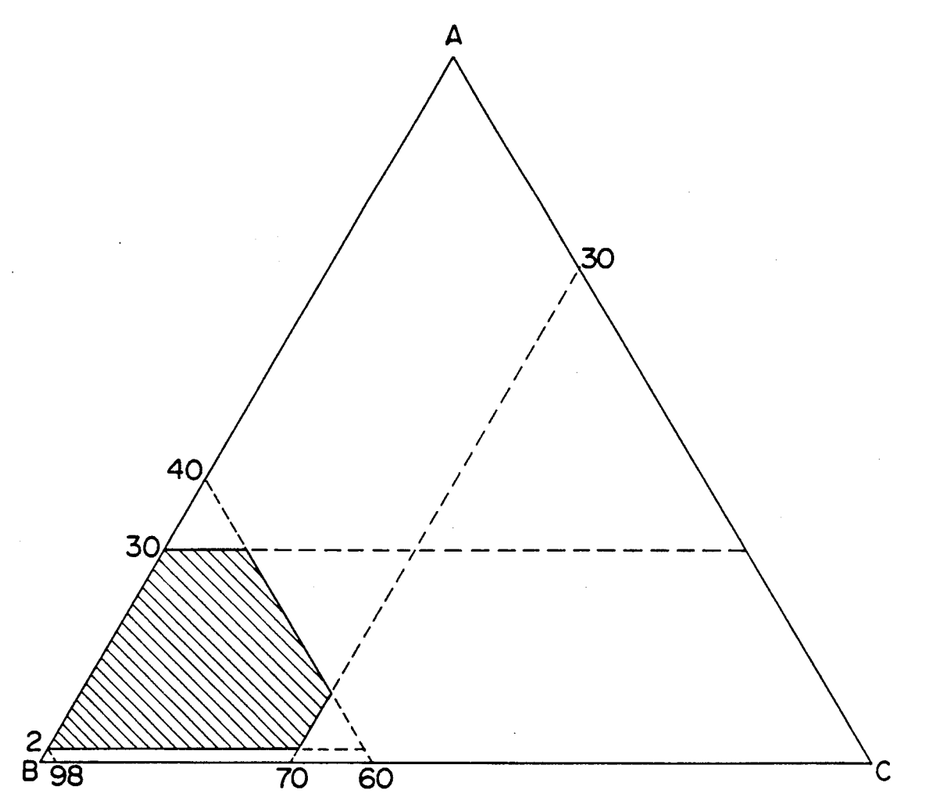
The Figure is a triangular diagram indicating the region covered by the present invention. In the diagram, the portion indicated by hatching corresponds to the scope of the present invention.

In the accompanying Figure, the region covered by the present invention is shown by way of a triangular diagram. In the diagram, the area indicated by hatching corresponds to the scope of the present invention.

The copolymer of the present invention can be produced in accordance with conventional polymerization practices, such as cast polymerization, bulk polymerization, suspension polymerization, solution polymerization and emulsion polymerization.

When solution polymerization is employed, there may be used a solution prepared by dissolving a monomer mixture of tert-butylcyclohexyl methacrylate, methyl methacrylate and, optionally, an ethylenically unsaturated compound of formula (1), in an aromatic hydrocarbon solvent, such as toluene and ethylbenzene. When suspension polymerization or emulsion polymerization is employed, water may be used as a medium. When bulk polymerization is employed, polymerization may be initiated by the action of free radicals generated by heating, or may be initiated by radiation. As the proportions of the components in the monomer mixture, there can be used substantially the same proportions as those of the monomer units of components (A), (B) and (C) of the copolymer to be produced.

With respect to the initiator to be used in the polymerization for obtaining the resin of the present invention, there may be employed any of conventionally employed initiators which are usually used for radical polymerization. Particularly preferable examples of initiators include an azo compound such as azobisisobutyronitrile; and an organic peroxide such as benzoyl peroxide, lauroyl peroxide or tert-butylperoxy-2-ethylhexanoate. The initiator is generally used in an amount in the range of from 0.01 to 10% by weight based on the total weight of the monomers. With respect to the molecular weight modifier which can optionally be used in the polymerization for obtaining the resin of the present invention, there may be employed any conventional molecular weight modifier which is usually used for radical polymerization. Particularly preferable examples of molecular weight modifiers include mercaptan compounds, such as butyl mercaptan, octyl mercaptan, dodecyl mercaptan and 2-ethylhexyl thioglycolate.

The temperature to be used in the polymerization for obtaining the resin of the present invention is not particularly limited, and is generally chosen in the range of from 0° to 150° C., preferably 50° to 120° C. The most suitable polymerization temperature is chosen, taking into consideration the types of polymerization method, polymerization apparatus, polymerization initiator and molecular weight modifier, etc. as well as desired properties of the copolymer resin to be obtained. The polymerization is generally conducted for about 120 min to 150 min, followed by curing for about 1 hour, thereby obtaining the copolymer of the present invention.

The weight average molecular weight of the copolymer of the present invention is in the range of from $10^4$ to $10^7$. When a shaped article such as a light transmissible plate is directly obtained by polymerization, for example, by a cast method, a relatively high weight average molecular weight such as $10^5$ to $10^7$ can be obtained. With respect to injection-molded articles such as an optical disc substrate, it is generally in the range of from $1 \times 10^4$ to $2 \times 10^5$, preferably $5 \times 10^4$ to $1.5 \times 10^5$, more preferably $5 \times 10^4$ to $1 \times 10^5$. In this case, if the weight average molecular weight is less than $10^4$, mechanical strength is lowered, whereas if the weight average molecular weight exceeds $2 \times 10^5$, mold-pattern transferability is lowered. With respect to extruded articles such as a light transmissible extruded plate, the weight average molecular weight is in the range of from $1 \times 10^5$ to $3 \times 10^5$, preferably in the range of from $1.5 \times 10^5$ to $2.5 \times 10^5$. In this case, if the weight average molecular weight is less than $1 \times 10^5$, mechanical strength and dimensional stability are insufficient, whereas if the weight average molecular weight exceeds $3 \times 10^5$, extrusion cannot be performed under customary extrusion molding conditions and if extrusion is conducted at high temperatures, heat decomposition and discoloration occur.

The weight average molecular weight is measured by GPC (gel permeation chromatography) using standard polystyrene as the standard sample.

The content of each of the components present in the copolymer of the present invention, i.e., tert-butylcyclohexyl methacrylate, methyl methacrylate, and ethylenically unsaturated compound represented by formula (1) which is copolymerizable with the above-mentioned two components, can be determined by $^{13}$C-NMR method (nuclear magnetic resonance method). That is, the determination can be conducted by dissolving the copolymer in a deuterated solvent [CDCl$_3$, C$_6$D$_6$, CD$_3$NO$_2$, DMSO(dimethyl sulfoxide)-d$_6$] and subjecting the resultant solution to spectrum analysis of $^{13}$C nuclei at room temperature or at an elevated temperature.

The copolymer of the present invention may be used alone. But, the copolymer of the present invention may be blended with other resins, such as polymethyl methacrylate, an acrylonitrile-styrene copolymer, a methyl methacrylate-styrene copolymer and the like, as long as the desired properties of the copolymer of the present invention, such as excellent transparency, excellent moldability, low double refraction, high heat stability, low moisture absorption and high heat resistance, are not impaired.

When the copolymer of the present invention contains large quantities of monomers remaining unreacted, the desired properties of the copolymer, such as high heat resistance and high heat stability, are impaired. Therefore, the remaining monomer content is preferably as small as possible. The allowable remaining monomer content is 5% by weight or less, preferably 2% by weight or less, more preferably 1% by weight or less. In the copolymer of the present invention, the remaining monomer content can be suppressed to a practically low level by conducting the polymerization under the usual polymerization conditions as described above, but it is preferred to remove the remaining monomers in accordance with conventional practices so that the remaining monomer content of the copolymer may be further decreased. Examples of the method for the removal of the remaining monomers include a method in which the copolymer obtained is heated under air stream, a method in which it is heated under reduced pressure and a method in which it is extruded under reduced pressure by means of a vented extruder, while venting.

In the copolymer resin of the present invention, in order to improve various properties of the resin, a conventional additive may be incorporated in such an amount that the excellent characteristic properties of the copolymer are not impaired. Examples of additives include various antioxidants, heat stabilizers, ultraviolet light absorbers, metal sealants, lubricants, release agents, plasticizers, impact modifiers, antistatic agents, fire retardants, antiseptics, dyes and pigments.

From the methacrylic copolymer resin of the present invention, various useful shaped articles imparted with the excellent properties of the present copolymer can be obtained by customary molding methods known in the plastics technology.

By extrusion molding of the copolymer resin of the present invention, a light transmissible extruded plate can be obtained. That is, the present copolymer resin melted in an extruder can be worked into a flat plate by taking it off on a take-off roll maintained at an appropriate temperature. Temperature conditions for extrusion and taking off are selected according to the properties and use of the extruded plate, and the extrusion molding is generally conducted at a temperature in the range of from 200° C. to 280° C. Light transmissible extruded plates as obtained by extrusion molding are used as a signboard, a display, a partition, a window for lighting, a front plate for a television and a front plate for a liquid crystal display and exhibit excellent performances, since the plates are excellent in low moisture absorption properties, heat resistance, transparency, heat stability and mechanical strengths, etc.

Further, by a cast method, there can be obtained light transmissible plates comprising the present copolymer resin having a high weight average molecular weight and high mechanical strengths. The plates can advantageously be employed for various applications.

The copolymer resin of the present invention can be molded into various optical element substrates by injection molding, compression molding, etc. From the viewpoints of productivity, dimensional accuracy, etc., injection molding is preferably employed. As stated before, the "optical element substrate" is intended to mean a substrate body for an optical element. Examples of optical elements include an optical disc for information recording (hereinafter referred to as an optical disc), an optical card for information recording, an optical sheet for information recording, an optical film for information recording, a lens, a mirror and a prism. Further, a tail lamp, a meter cover, etc. for an automobile can advantageously be obtained by injection molding.

In order to obtain an optical disc, the methacrylic copolymer resin of the present invention is injection molded using a disc-shaped die having one surface with a fine concavo-convex pattern to thereby obtain a substrate, and a memory function layer, a reflective layer and a protective layer are formed on the substrate and, if desired, two of the resultant disc are laminated together directly or through a gaseous or solid intermediate layer. With respect to the production method of a substrate, in addition to the injection molding, various methods can be employed. For example, the methacrylic resin may be subjected to cast polymerization or extrusion molding to obtain a flat plate, and the flat plate is then subjected to compression molding, thereby obtaining a substrate, or a substrate may also be obtained directly by cast polymerization.

An optical disc is a disc for recording information, on which information is recorded by means of light, or from which information recorded is read out by means of light. Examples of optical discs include various types of discs, such as a read-only disc, a direct read after write disc and an erasable direct read after write disc. Further, examples of optical discs include a disc which is produced by laminating two substrates one on the other, such as a video disc, as well as a disc made up of a single substrate, such as a compact disc. Still further, examples of optical discs include a disc produced by forming a memory layer of a metal, a pigment or the like on the surface of a smooth substrate and an optical magnetic disc having a memory layer of a magnetic material, in addition to an usual disc made of a substrate having on its surface fine concaves and convexes that code signals or are to be formed into signals.

As stated before, an optical disc substrate obtained by molding the methacrylic copolymer of the present invention not only has excellent properties inherent in methyl methacrylate, such as excellent transparency, moldability, low double refraction and heat stability, but also is greatly improved in properties for which methyl methacrylate is poor such as low moisture absorption properties and heat resistance. A video disc produced using an optical disc substrate comprising the copolymer resin of the present invention, can be used under severe conditions such as high humidity and high temperature conditions, since the resin has low moisture absorption and highly heat resistant properties.

Further, when an optical disc substrate comprising the copolymer resin of the present invention is used as a compact disc substrate which is conventionally made from a polycarbonate resin, there can easily be obtained a compact disc which has a high precision as compared to that of a polycarbonate resin substrate, since the resin of the present invention has low double refraction and excellent moldability properties.

Further, the copolymer of the present invention can advantageously be employed as a substrate material for an optical disc of large information recording capacity, which is made up of a single substrate as in the case of a compact disc but is larger in size than a compact disc so that practical production of it has been difficult.

Moreover, there has conventionally not been obtained an optical disc substrate which has properties required for substrates to be used for direct read after write discs or erasable direct read after write discs including an optical magnetic disc, such discs being required to have higher precision than a video disc or a compact disc and often required to have a large capacity of information. Such discs are often used under more severe conditions than a video disc or a compact disc. In contrast, an optical disc substrate comprising the copolymer resin of the present invention can advantageously be used for these applications.

BEST MODE FOR CARRYING OUT THE INVENTION

The present invention will be described in more detail with reference to the Examples, which should not be construed as limiting the scope of the present invention.

In the Examples, the physical properties were measured by the following methods.

(1) Remaining monomers

A sample was dissolved in acetone containing n-butyl alcohol as an internal standard substance and subjected to programmed-temperature gas chromatography, to thereby determine the amount of remaining monomers.

(2) The proportions of components of a copolymer

Spectrum analysis of $^{13}C$ nucleus at a specific position for respective component was performed by nuclear magnetic resonance (NMR) method to determine the respective proportion. For the measurement, a sample copolymer was dissolved in DMSO-$d_6$ and the analysis was conducted at a temperature of 70° C. with an integrated number of 12,000 times in the quantitative mode.

(3) Weight average molecular weight ($\overline{M}w$)

Beads of a polymer obtained by polymerization were dissolved in dichloromethane (50 mg/30 ml), to thereby prepare a sample solution and the solution was subjected to gel permeation chromatography (GPC) measurement. From the results of the measurement, a weight average molecular weight was calculated using a calibration curve as obtained by converting the calibration curve obtained by molecular weight measurement of standard polystyrene to that adapted for polymethyl methacrylate.

(4) Tensile break strength

Measurement was conducted in accordance with ASTM-D638. A test piece was subjected to annealing at 96° C. for 2 hours and then to conditioning (for 48 hours at 23° C. under a relative humidity of 52%) before measurement.

(5) Heat distortion temperature (HDT)

Measurement was conducted in according with ASTM-D648. A test piece was subjected to annealing at 96° C. for 2 hours and then to conditioning (for 48 hours at 23° C. under a relative humidity of 52%) before measurement.

(6) Equilibrium water absorption

Measurement was conducted at 23° C. in accordance with ASTM-D570.

(7) Transmission of all light rays

Measurement was conducted at 23° C. in accordance with ASTM-D1003.

(8) Double refraction

Using a disc having information signals on its one surface, a portion of the disc at a distance of 50 mm from the center was subjected to measurement of double refraction by means of a polarizing microscope.

(9) Moisture absorption-warpage (i) Optical disc substrate

Warpage test of an optical disc substrate was conducted for 10 hours at a temperature of 50° C. under a relative humidity of 90%. The increasing distance of the center of the disc substrate from a plane contacting the disc substrate by at least two points on the periphery of the disc substrate was hourly measured, thereby determining a maximum warpage.

(ii) Extruded plate

With respect to a test piece obtained by cutting an extruded plate into a 2×300×300 mm size, one surface of the test piece was covered with a SARAN® film and allowed to stand at a temperature of 50° C. under a relative humidity of 90% for 48 hours. Then, the warpage of the test piece (the difference in height between the center of the plate and the middle point of one side of the plate, with the plate being placed on a horizontal plane) was measured.

EXAMPLE 1

Into a glass-made separable flask having a capacity of 10 l were introduced 5 l of water, 50 g of polypotassium acrylate and 1.5 g of sodium hydrogenphosphate, and the resultant mixture was stirred at 30° to 35° C. to prepare an aqueous phase. Separately, into another glass vessel were introduced 88 g (2% by mole) of p-tert-butylcyclohexyl methacrylate [cis isomer/trans isomer=23/77(w/w)], 1879 g (96% by mole) of methyl methacrylate and 33 g (2% by mole) of methyl acrylate, and, to the total weight of these monomers of 2000 g (100 parts by weight) were added 3 g (0.15 part by weight) of azobisisobutyronitrile and 4 g (0.20 part by weight) of n-octyl mercaptan, thereby preparing a monomer phase.

The monomer phase was added to the above-mentioned aqueous phase and suspended in the aqueous phase by stirring. Then, the air in the separable flask was replaced with nitrogen and polymerization was conducted by keeping the mixture at a temperature of 75° C. for 2 hours while stirring. Then, the temperature was elevated to 95° C. and the temperature was maintained for 1 hour, to thereby complete the reaction. Subsequently, the polymerization system was cooled down to room temperature and the content was subjected to filtration, washing with water and then drying, thereby obtaining colorless beads of a polymer.

The thus obtained polymer beads were extruded using a vented twin-screw extruder having a screw diameter of 30 mm$\phi$ at 230° C. and at a vacuum degree at the vent of 730 mmHg or more to thereby obtain an extrudate in a strand form, and the extrudate was cut by a cutter, thereby obtaining a granular product (pellets).

The pellets obtained was subjected to injection molding at 230° C. using a 3-oz screw-type injection molding machine, thereby obtaining test pieces. The analysis results of the above-obtained polymer beads and test pieces are shown in Table 1 and Table 2.

EXAMPLES 2 to 12

The polymerization, molding and evaluation were performed in substantially the same manner as in Example 1 except that the types and proportions of the monomers and the amount of the molecular weight modifier (n-octyl mercaptan) were changed to those indicated in Table 1. The results are shown in Table 1 and Table 2.

EXAMPLE 13

The polymerization, molding and evaluation were performed in substantially the same manner as in Example 1 except that o-tert-butylcyclohexyl methacrylate [cis isomer/para isomer=23/77 (w/w)] was employed in place of p-tert-butylcyclohexyl methacrylate and that the proportions of the monomers were changed to those indicated in Table 1. The results are shown in Table 1 and Table 2.

EXAMPLE 14

The polymerization, molding and evaluation were performed in substantially the same manner as in Example 1 except that m-tert-butylcyclohexyl methacrylate [cis isomer/para isomer=23/77 (w/w)] was employed in place of p-tert-butylcyclohexyl methacrylate and that the proportions of the monomers were changed to those indicated in Table 1. The results are shown in Table 1 and Table 2.

EXAMPLE 15

Optical disc substrate

Using the pellets obtained in Example 1 and a precision injection molding machine (M-200/800DM manufactured and sold by Meiki Seisakusho, Japan), a substrate of 300 mm$\phi$ and 1.2 mm in thickness having information signals on its one surface was obtained. The injection molding was conducted at 290° C. under high injection pressure and at high injection speed.

The substrate was fixed in a vapor-deposition apparatus, and vapor deposition of aluminum was conducted under a vacuum of $10^{-8}$ mmHg and further an UV coating (an acrylic resin coating which is cross-linked by irradiation with ultraviolet rays) was applied thereto as a protective layer, thereby preparing a substrate having its one surface vapor deposited with aluminum. With respect to the thus obtained substrate having its one surface vapor deposited with aluminum, measurements of double refraction and moisture absorption-warpage were conducted. The results are shown in Table 3.

EXAMPLES 16 to 28

Optical disc substrate

Using the pellets obtained in Examples 2 to 14, respectively, optical disc substrates were prepared in the same manner as in Example 15. With respect to the substrates, measurements of double refraction and moisture absorption-warpage were conducted. The results are shown in Table 3.

EXAMPLE 29

Extruded plate

The polymerization was conducted in substantially the same manner as in Example 1 except that the amount of n-octyl mercaptan to be added was changed to 0.16 part by weight, thereby obtaining polymer beads. From these beads, pellets were obtained using an extruder. Then, the pellets were extruded using a vented twin-screw extruder having a screw diameter of 30 mm$\phi$ and provided with a die for a flat plate, at 230° C. and at a vacuum degree at the vent of 730 mmHg or more, and the resultant melted resin extrudate was taken off on a take-off roll which had been heated to 120° C. or more, thereby obtaining an extruded plate of good appearance which was colorless and transparent. With respect to the extruded plate thus obtained, moisture absorption-warpage was measured. The result is shown in Table 4.

EXAMPLES 30 to 35

Extruded plate

The polymerization was conducted in substantially the same manner as in Example 1 except that the proportions of the monomers and the amount of the molecular weight modifier (n-octyl mercaptan) were changed to those indicated in Table 4. Using the resultant polymer, extruded plates were prepared in substantially the same manner as in Example 29, followed by measurements of moisture absorption-warpage. The results are shown in Table 4.

COMPARATIVE EXAMPLE 1

The polymerization, molding and property evaluation were conducted in substantially the same manner as in Example 1 except that, as indicated in Table 5, 98% by mole of methyl methacrylate and 2% by mole of methyl acrylate were employed as the monomers. The results are shown in Table 6.

in Example 1 except that the proportions of the monomers were changed to those indicated in Table 5. The results are shown in Table 6.

COMPARATIVE EXAMPLE 4

The polymerization, molding and property evaluation were conducted in substantially the same manner as in Example 3 except that, as indicated in Table 5, isobutyl acrylate was employed in place of p-tert-butylcyclohexyl methacrylate. The results are shown in Table 6.

COMPARATIVE EXAMPLE 5

The polymerization, molding and property evaluation were conducted in substantially the same manner as in Example 3 except that, as indicated in Table 5, cyclohexyl methacrylate was employed in place of p-tert-butylcyclohexyl methacrylate. The results are shown in Table 6.

COMPARATIVE EXAMPLES 6 to 10

The copolymers respectively obtained in Comparative Examples 1 to 5 were pelletized. From the pellets, optical disc substrates were prepared and evaluations of properties were conducted in substantially the same manner as in Example 15. The results are shown in Table 7.

TABLE 1

| Example No. | Composition of starting monomers | | | | | Concentration of remaining monomers (wt %) (beads/pellets) | Weight[3] average molecular weight ($\overline{Mw}$) ($\times 10^4$) | Composition of copolymer[4] | | |
|---|---|---|---|---|---|---|---|---|---|---|
| | t-BCHMA (mol %) | MMA (mol %) | Ethylenically unsaturated compound monomer (mol %) | | Initi-[1] ator (Part by wt.) | Molecu-[2] lar weight modifier (Part by wt.) | | | t-BCHMA (mol %) | MMA (mol %) | Ethylenically unsaturated compound monomer (mol %) |
| | | | Type | Amount (mol %) | | | | | | | |
| 1 | 2 | 96 | MA | 2 | 0.15 | 0.20 | 0.2/0.1 | 13.5 | 2.4 | 95.5 | 2.1 |
| 2 | 4 | 94 | MA | 2 | 0.15 | 0.20 | 0.2/0.1 | 13.7 | 4.0 | 94.1 | 1.9 |
| 3 | 10 | 88 | MA | 2 | 0.15 | 0.20 | 0.4/0.2 | 13.1 | 9.5 | 88.7 | 1.8 |
| 4 | 20 | 78 | MA | 2 | 0.15 | 0.20 | 0.4/0.3 | 13.7 | 17.3 | 80.8 | 1.9 |
| 5 | 20 | 70 | MA | 10 | 0.15 | 0.20 | 0.4/0.2 | 13.7 | 18.4 | 71.8 | 9.8 |
| 6 | 30 | 68 | MA | 2 | 0.15 | 0.20 | 0.5/0.3 | 13.3 | 29.1 | 68.9 | 2.0 |
| 7 | 10 | 87 | EA | 3 | 0.15 | 0.20 | 0.3/0.2 | 13.8 | 9.8 | 87.6 | 2.6 |
| 8 | 10 | 80 | EA | 10 | 0.15 | 0.20 | 0.4/0.3 | 13.4 | 10.0 | 80.9 | 9.1 |
| 9 | 10 | 88 | IBA | 2 | 0.15 | 0.20 | 0.4/0.3 | 13.4 | 9.8 | 88.4 | 1.8 |
| 10 | 10 | 81 | IBA | 9 | 0.15 | 0.20 | 0.3/0.1 | 13.8 | 9.9 | 81.1 | 9.0 |
| 11 | 10 | 70 | St | 20 | 0.15 | 0.20 | 0.3/0.2 | 13.1 | 9.7 | 76.7 | 20.6 |
| 12 | 10 | 88 | MA | 2 | 0.15 | 0.29 | 0.4/0.2 | 7.9 | 9.3 | 89.1 | 1.6 |
| 13 | 10 | 88 | MA | 2 | 0.15 | 0.20 | 0.4/0.3 | 13.2 | 9.7 | 88.6 | 1.7 |
| 14 | 10 | 88 | MA | 2 | 0.15 | 0.20 | 0.4/0.2 | 13.6 | 9.8 | 88.6 | 1.6 |

(Note)
t-BCHMA: tert-butylcyclohexyl methacrylate
IBA: isobutyl acrylate
EA: ethyl acrylate
MA: methyl acrylate
MMA: methyl methacrylate
St: styrene
[1]Initiator: N,N'-azobisisobutyronitrile
[2]Molecular weight modifier: n-octyl mercaptan
[3]Conditions for GPC measurement: 50 mg in 30 ml of dichloromethane
[4]Conditions for $^{13}$C-NMR measurement: DMSO-$d_6$, 70° C., an integrated number of times of 12,000, and quantitative mode

COMPARATIVE EXAMPLES 2 and 3

The polymerization, molding and property evaluation were conducted in substantially the same manner as

TABLE 2

| Example No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Tensile break strength (kg/cm$^2$) | 770 | 760 | 750 | 710 | 720 | 640 | 740 | 730 | 740 | 750 | 740 | 670 | 650 | 670 |
| HDT(°C.)[1] | 107 | 108 | 111 | 114 | 103 | 117 | 98 | 87 | 99 | 87 | 110 | 109 | 103 | 105 |

TABLE 2-continued

| Example No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Equilibrium water absorption (%) | 1.8 | 1.5 | 1.3 | 1.0 | 1.0 | 0.6 | 1.2 | 1.3 | 1.5 | 1.5 | 1.1 | 1.4 | 1.4 | 1.3 |
| Transmission of all light rays (%) | 93 | 93 | 93 | 93 | 93 | 92 | 93 | 93 | 93 | 93 | 90 | 93 | 92 | 93 |

(Note)
[1]HDT: Heat distortion temperature

TABLE 3

| Example No. | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Double refraction (nm) | 23 | 19 | 19 | 16 | 17 | 19 | 20 | 22 | 19 | 23 | 70 | 17 | 18 | 19 |
| Moisture absorption-warpage (μm) | 680 | 470 | 310 | 240 | 230 | 190 | 380 | 330 | 370 | 330 | 310 | 370 | 340 | 310 |

TABLE 4

| | Composition of starting monomers | | | | | | |
|---|---|---|---|---|---|---|---|
| | | | Ethylenically unsaturated compound monomer (mol %) | | | Molecular[2] | Concentration of remaining |
| Example No. | t-BCHMA (mol %) | MMA (mol %) | Type | Amount (mol %) | Initiator[1] (Part by wt.) | weight modifier (Part by wt.) | monomer (wt %) (beads/pellets) |
| 29 | 2 | 96 | MA | 2 | 0.15 | 0.16 | 0.3/0.1 |
| 30 | 4 | 94 | MA | 2 | 0.15 | 0.16 | 0.3/0.2 |
| 31 | 10 | 88 | MA | 2 | 0.15 | 0.16 | 0.4/0.2 |
| 32 | 20 | 78 | MA | 2 | 0.15 | 0.16 | 0.3/0.2 |
| 33 | 30 | 68 | MA | 2 | 0.15 | 0.16 | 0.4/0.3 |
| 34 | 10 | 88 | MA | 2 | 0.15 | 0.14 | 0.4/0.3 |
| 35 | 10 | 88 | MA | 2 | 0.15 | 0.13 | 0.3/0.2 |

| | | Composition of copolymer[4] | | | |
|---|---|---|---|---|---|
| Example No. | Weight[3] average molecular weight ($\overline{Mw}$) (×10⁴) | t-BCHMA (mol %) | MMA (mol %) | Ethylenically unsaturated compound monomer (mol %) | Moisture absorption warpage (μm) |
| 29 | 16.4 | 1.9 | 96.4 | 1.7 | 850 |
| 30 | 16.5 | 3.8 | 94.5 | 1.7 | 685 |
| 31 | 16.4 | 9.7 | 88.6 | 1.7 | 250 |
| 32 | 16.1 | 18.8 | 79.3 | 1.9 | 210 |
| 33 | 16.4 | 29.0 | 69.1 | 1.9 | 200 |
| 34 | 18.3 | 9.9 | 88.1 | 1.9 | 230 |
| 35 | 21.0 | 9.8 | 88.3 | 1.9 | 235 |

(Note)
t-BCHMA: tert-butylcyclohexyl methacrylate
IBA: isobutyl acrylate
EA: ethyl acrylate
MA: methyl acrylate
MMA: methyl methacrylate
St: styrene
[1]Initiator: N,N'-azobisisobutyronitrile
[2]Molecular weight modifier: n-octyl mercaptan
[3]Conditions for GPC measurement: 50 mg in 30 ml of dichloromethane
[4]Conditions for ¹³C-NMR measurement: DMSO-d₆, 70° C., an integrated number of times of 12,000, and quantitative mode

TABLE 5

| | Composition of starting monomers | | | | | | |
|---|---|---|---|---|---|---|---|
| | Monomer① | | Monomer② | Monomer③ | | | Molecular[2] |
| Comparative Example No. | Type | Amount (mol %) | (MMA) (mol %) | Type | Amount (mol %) | Initiator[1] (Part by wt.) | weight modifier (Part |
| 1 | — | — | 98 | MA | 2 | 0.20 | 0.15 |
| 2 | t-BCHMA | 50 | 48 | MA | 2 | 0.20 | 0.15 |
| 3 | t-BCHMA | 10 | 50 | MA | 40 | 0.20 | 0.15 |
| 4 | IBOMA | 10 | 88 | MA | 2 | 0.20 | 0.15 |
| 5 | CHMA | 10 | 88 | MA | 2 | 0.20 | 0.15 |

Concentration

TABLE 5-continued

| Comparative Example No. | of remaining monomers (wt %) (beads/pellets) | Weight[3] average molecular weight (Mw) (×10[4]) | Composition of copolymer[4] | | |
|---|---|---|---|---|---|
| | | | Monomer① (mol %) | Monomer② (MMA) (mol %) | Monomer③ (mol %) |
| 1 | 0.2/0.1 | 13.6 | — | 98.3 | 1.7 |
| 2 | 1.4/0.9 | 13.1 | 52.0 | 46.1 | 1.9 |
| 3 | 0.8/0.6 | 13.2 | 10.4 | 51.5 | 38.1 |
| 4 | 4.3/3.7 | 13.1 | 10.3 | 88.0 | 1.7 |
| 5 | 0.3/0.2 | 13.7 | 10.6 | 87.5 | 1.9 |

(Note)
t-BCHMA: tert-butylcyclohexyl methacrylate
IBOMA: isobornyl methacrylate
MMA: methyl methacrylate
CHMA: cyclohexyl methacrylate
[1]Initiator: N,N'-azobisisobutyronitrile
[2]Molecular weight modifier: n-octyl mercaptan
[3]Conditions for GPC measurement: 50 mg in 30 ml of dichloromethane
[4]Conditions for $^{13}$C-NMR measurement: DMSO-$d_6$, 70° C., an integrated number of times of 12,000, and quantitative mode

TABLE 6

| Comparative Example Nos. | 1 | 2 | 3 | 4 | 5 |
|---|---|---|---|---|---|
| Tensile break strength (kg/cm[2]) | 770 | 230 | 810 | 520 | 730 |
| HDT (°C.)[1] | 94 | 105 | 70 | 101 | 87 |
| Equilibrium water absorption (%) | 2.1 | 0.3 | 1.4 | 1.6 | 1.7 |
| Transmission of all right rays (%) | 92 | 92 | 91 | 92 | 92 |

Note
[1]HDT: Heat distortion temperature

TABLE 7

| Comparative Example Nos. | 6 | 7 | 8 | 9 | 10 |
|---|---|---|---|---|---|
| Double refraction (nm) | 20 | 23 | 19 | 19 | 21 |
| Moisture absorption-warpage (μm) | 740 | 160 | 230 | 250 | 300 |

Industrial Applicability

The methacrylic copolymer of the present invention is a novel resin which not only has excellent properties inherent in a methyl methacrylate resin, such as excellent transparency, moldability, low double refraction and heat stability, but also is greatly improved with respect to properties for which a metyl methacrylate resin is poor such as low moisture absorption and heat resistant properties, without sacrificing the mechanical strengths of the resin. Since the methacrylic copolymer of the present invention has such excellent properties, a shaped article produced therefrom can advantageously be used for various applications and is particularly suitable for use as a material for substrates of optical elements, such as an optical disc for information recording (optical disc), an optical card for information recording, an optical sheet for information recording, an optical film for information recording, a lens, a mirror, a prism, a light transmission fiber, etc. and as a material for light transmissible plates which are used as a signboard, a display, a partition, a window for lighting, a front plate for a television, a front plate for a liquid crystal display, etc.

We claim:

1. A methacrylic copolymer having low moisture absorption properties, comprising (A) 2 to 30% by mole of tertbutylcyclohexyl methacrylate units, (B) 60 to 98% by mole of methyl methacrylate units and (C) 0 to 30% by mole of ethylenically unsaturated compound units represented by formula (1):

$$CH_2=C\begin{matrix}R_1\\R_2\end{matrix} \quad (1)$$

wherein $R_1$ is a hydrogen atom or a methyl group and $R_2$ is a phenyl group, a methyl-substituted phenyl group or $$\begin{matrix}COZ\\\|\\O\end{matrix}$$

wherein Z is an alkyl group having 1 to 8 carbon atoms, which is unsubstituted or substituted with a fluorine atom, the total of (A), (B) and (C) being 100% by mole, and the copolymer having a weight average molecular weight in the range of from $10^4$ to $10^7$.

2. The methacrylic copolymer having low moisture absorption properties according to claim 1, wherein the proportion of ethylenically unsaturated compound units (C) is 1 to 10% by mole and wherein $R_1$ in formula (1) is H and $R_2$ in formula (1) is $$\begin{matrix}COZ\\\|\\O\end{matrix}$$

wherein Z is an alkyl group having 1 to 8 carbon atoms.

3. The methacrylic copolymer having low moisture absorption properties according to claim 1, wherein the proportion of ethylenically unsaturated compound units (C) is 5 to 30% by mole and wherein $R_2$ in formula (1) is a phenyl group or a methyl-substituted phenyl group.

4. The methacrylic copolymer having low moisture absorption properties according to any one of claims 1 to 3, wherein said copolymer is in the form of a shaped article.

5. The methacrylic copolymer having low moisture absorption properties according to claim 4, wherein said shaped article is an injection-molded article.

6. The methacrylic copolymer having low moisture absorption properties according to claim 5, wherein said injection-molded article is an optical element substrate.

7. The methacrylic copolymer having low moisture absorption properties according to claim 6, wherein said optical element substrate is an optical disc substrate.

8. The methacrylic copolymer having low moisture absorption properties according to claim 5, wherein said copolymer has a weight average molecular weight in the range of from $10^4$ to $2 \times 10^5$.

9. The methacrylic copolymer having low moisture absorption properties according to claim 8, wherein said copolymer has a weight average molecular weight in the range of from $5 \times 10^4$ to $1.5 \times 10^5$.

10. The methacrylic copolymer having low moisture absorption properties according to claim 4, wherein said shaped article is an extruded article.

11. The methacrylic copolymer having low moisture absorption properties according to claim 10, wherein said extruded article is a light transmissible extruded plate.

12. The methacrylic copolymer having low moisture absorption properties according to claim 10, wherein said copolymer has a weight average molecular weight in the range of from $10^5$ to $3 \times 10^5$.

13. The methacrylic copolymer having low moisture absorption properties according to claim 12, wherein said copolymer has a weight average molecular weight in the range of from $1.5 \times 10^5$ to $2.5 \times 10^5$.

14. The methacrylic copolymer having low moisture absorption properties according to claim 4, wherein said shaped article is a light transmissible plate obtained by cast method.

15. The methacrylic copolymer having low moisture absorption properties according to claim 6, wherein said copolymer has a weight average molecular weight in the range of from $10^4$ to $2 \times 10^5$.

16. The methacrylic copolymer having low moisture absorption properties according to claim 7, wherein said copolymer has a weight average molecular weight in the range of from $10^4$ to $2 \times 10^5$.

17. The methacrylic copolymer having low moisture absorption properties according to claim 11, wherein said copolymer has a weight average molecular weight in the range of from $10^5$ to $3 \times 10^5$.

* * * * *